United States Patent [19]
Dysart

[11] Patent Number: 5,441,120
[45] Date of Patent: Aug. 15, 1995

[54] ROLLER CONE ROCK BIT HAVING A SEALING SYSTEM WITH DOUBLE ELASTOMER SEALS

[75] Inventor: Theodore R. Dysart, Arlington, Tex.

[73] Assignee: Dresser Industries, Inc., Dallas, Tex.

[21] Appl. No.: 299,492

[22] Filed: Aug. 31, 1994

[51] Int. Cl.6 ............................................. E21B 10/22
[52] U.S. Cl. ....................................... 175/228; 175/371; 384/93
[58] Field of Search ..................... 175/227, 228, 371; 384/94, 95

[56] References Cited

U.S. PATENT DOCUMENTS

| | | |
|---|---|---|
| 3,096,835 | 7/1963 | Neilson . |
| 3,125,175 | 3/1964 | Medlock et al. . |
| 3,467,448 | 9/1969 | Galle . |
| 3,604,523 | 6/1970 | Lichte . |
| 3,656,764 | 4/1972 | Robinson ................. 277/92 |
| 3,739,864 | 6/1973 | Cason, Jr. et al. ........ 175/228 |
| 3,844,364 | 10/1974 | Crow ....................... 175/228 |
| 3,921,735 | 11/1975 | Dysart ...................... 175/337 |
| 3,952,815 | 4/1976 | Dysart ...................... 175/374 |
| 4,056,153 | 11/1977 | Miglierni ................... 175/376 |
| 4,073,548 | 2/1978 | Walters . |
| 4,087,100 | 5/1978 | Yoshihashi et al. ...... 277/92 |
| 4,092,054 | 5/1978 | Dye . |
| 4,098,358 | 7/1978 | Klima ........................ 175/65 |
| 4,102,419 | 7/1978 | Klima ........................ 175/371 |
| 4,158,394 | 6/1979 | Ernst et al. ............... 175/228 |
| 4,176,848 | 12/1979 | Lafuze ....................... 277/92 |
| 4,179,003 | 12/1979 | Cooper et al. ............ 175/371 |
| 4,183,416 | 1/1980 | Walters ..................... 175/228 X |
| 4,183,417 | 1/1980 | Levefelt .................... 175/339 |
| 4,199,856 | 4/1980 | Farrow et al. ............ 29/454 |
| 4,225,144 | 9/1980 | Zitz et al. .................. 277/12 |
| 4,249,622 | 2/1981 | Dysart ....................... 175/227 |
| 4,253,710 | 3/1981 | Goodman . |
| 4,256,193 | 3/1981 | Kunkel et al. ............ 175/371 |
| 4,258,806 | 3/1981 | Kunkel et al. ............ 175/370 |
| 4,272,134 | 6/1981 | Levefelt . |
| 4,279,450 | 7/1981 | Morris ...................... 175/372 X |
| 4,284,310 | 8/1981 | Olschewski et al. ...... 175/372 X |
| 4,287,957 | 9/1981 | Evans ........................ 175/17 |
| 4,298,079 | 11/1981 | Norlander et al. ........ 175/339 |
| 4,375,242 | 3/1983 | Galle ......................... 175/228 |
| 4,386,668 | 6/1983 | Parish ....................... 175/228 |
| 4,388,984 | 6/1983 | Oelke ........................ 184/54 |
| 4,421,184 | 12/1983 | Mullins ..................... 175/337 |
| 4,453,836 | 6/1984 | Klima ........................ 384/94 |
| 4,515,228 | 5/1985 | Dolezal et al. ........... 175/313 |
| 4,533,003 | 8/1985 | Bailey et al. ............. 175/269 |
| 4,552,235 | 11/1985 | Klima ........................ 175/371 |
| 4,593,775 | 6/1986 | Chaney et al. ............ 175/228 |
| 4,597,455 | 7/1986 | Walters et al. ........... 175/228 |

(List continued on next page.)

FOREIGN PATENT DOCUMENTS 201992  3/1979  United Kingdom .

Primary Examiner—Hoang C. Dang
Attorney, Agent, or Firm—Baker & Botts

[57] ABSTRACT

A roller cone rock bit (10) is provided that has a sealing system with double elastomer seals. A first elastomer seal (30) is disposed between a cone (18) having a cavity (24) and a spindle (16). A second elastomer seal (32) is disposed between cone (18) and spindle (16) forming a seal-gap (33). A main lubricant reservoir (49) has a diaphragm (56) disposed between an inner chamber (53) and an outer chamber (60). Inner chamber (53) is in fluid communication with cavity (24), and outer chamber (60) is in fluid communication with external fluids. Cavity (24) and inner chamber (50) are substantially filled with a first lubricant forming a first volume of lubricant. Diaphragm (56) is operable to transmit a pressure of the external fluids to the first volume of lubricant. A seal-gap lubricant reservoir (70) has a diaphragm (78) disposed between an inner chamber (75) and an outer chamber (82). Inner chamber (75) is in fluid communication with seal-gap (33), and outer chamber (82) is in fluid communication with the external fluids. Seal-gap (33) and inner chamber (75) are substantially filled with a second lubricant forming a second volume of lubricant. Diaphragm (78) is operable to transmit the pressure of the external fluids to the second volume of lubricant.

20 Claims, 3 Drawing Sheets

ROLLER CONE ROCK BIT HAVING A SEALING SYSTEM WITH DOUBLE ELASTOMER SEALS

This application is related to U.S. patent application Ser. No. 08/299,821, filed Aug. 31, 1994, entitled *Flat Seal for a Roller Cone Rock Bit* (Attorney's Docket No. 60220-0154); U.S. patent application Ser. No. 08/299,484, filed Aug. 31, 1994, entitled *Sealed and Lubricated Rotary Cone Drill Bit Having Improved Seal Protection* (Attorney's Docket No. 60220-0155); and U.S. patent application Ser. No. 08/299,485, filed Aug. 31, 1994 entitled *Compression Seal for a Roller Cone Rock Bit* (Attorney's Docket No. 60220-0156).

TECHNICAL FIELD OF THE INVENTION

This invention relates in general to the field of roller cone rock bits used in drilling a borehole in the earth, and more particularly to an improved roller cone rock bit having a sealing system with double elastomer seals.

BACKGROUND OF THE INVENTION

One type of drill bit used in forming a borehole in the earth is a roller cone rock bit. A typical roller cone rock bit comprises a body with an upper end adapted for connection to a drill string. A plurality of arms, typically three, depend from the lower end portion of the body with a cutter cone mounted on each arm. Each arm generally includes a spindle protruding radially inward and downward with respect to a projected rotational axis of the body. Each cutter cone also has an internal cavity shaped to receive an associated spindle. Each cutter cone may be mounted on a respective spindle and rotatably supported on bearings acting between the spindle and the inside of the cavity in the respective cutter cone. One or more nozzles are often located on the underside of the body and radially inward of the arms. These nozzles .generally are positioned to direct drilling fluid passing downwardly from the drill string to the bottom of the :borehole being formed. The drilling fluid washes away the material removed from the bottom of the borehole and cleanses the cutter cones carrying the cuttings radially outward then upward within the annulus defined between the bit body and the wall of the borehole.

Protection of the bearings that allow rotation of the cutter cones can lengthen the useful service life of a roller cone rock bit. Once drilling debris or external fluids are allowed to infiltrate between the bearing surfaces of the respective cutter cone and the spindle, failure of the roller cone rock bit will follow shortly. Various mechanisms are employed to keep debris and external fluids from entering between the bearing surfaces. A typical approach is to utilize an elastomer seal across the gap between the bearing surfaces of the rotating cutter cone and its associated spindle. However, when this seal fails, it is not long before external fluids or drilling debris will flow through the gap between the cutter cone and the spindle and contaminate the bearing surfaces. Thus, it is important that the seal be fully protected against wear caused by debris in the borehole and protected from pressure exerted by external fluids, such as drilling fluid or water, present in the borehole.

In a sealed roller cone rock bit, the cavity in the cutter cone and the bearings are often lubricated by packing the cavity and bearings with a lubricant such as grease. This lubricant is preferably sealed from the external environment by the elastomer seal across the gap between the cutter cone and the spindle. It is important for satisfactory bearing performance that the lubricant not be contaminated with external fluids or debris. This seal is especially important when the roller cone rock bit is used in drilling a deep well, such as a deep oil or gas well, where the borehole is filled with a column of water or other fluids exerting tremendous pressure on the seal. In such a high pressure downhole environment, the external fluids exert constant pressure on the outer side of the seal. If the seal fails, external fluids can mix with the lubricant and quickly cause failure of the roller cone rock bit. Thus, it is important to maintain the integrity of the seal.

One prior sealing system utilizes a sealed pressure equalizing lubrication system such that the pressure of the lubricant and the pressure of the external fluids are equalized through the operation of a diaphragm. An example of this system is shown in U.S. Pat. No. 4,597,455. The use of the diaphragm insures that the pressure on both sides of the seal is substantially equal. By equalizing the pressure, the lubrication system helps to protect the seal preventing debris, water and other external fluids from contaminating the lubrication system. In particular, the system disclosed in U.S. Pat. No. 4,597,455 places a pressure equalizing lubricant reservoir in the ball passage used to load ball bearings between the cutter cone and the spindle.

An additional safe guard used in some roller cone rock bits is a second seal outward from the first seal between each cutter cone and its associated spindle. The addition of a second seal creates a seal-gap between the second seal and the first seal. The second seal acts as an initial barrier to the external fluids and debris. An example of a roller cone rock bit having a seal-gap is described in U.S. Pat. No. 5,027,911 which shows a seal-gap that is connected to the bearings to allow lubricant to migrate from the bearings to the seal-gap.

It is important that the outer, second seal functions to protect the inner, first seal from external fluids and debris. In conventional roller cone rock bits, the second seal and the first seal cannot both be fluid tight seals, such as elastomer ring seals. If both seals were fluid-tight, a pressure differential may occur in the seal-gap between the first and second fluid tight seals. A difference in the pressure of the external fluids and the pressure of the lubricant as compared to the pressure in the seal gap would force each fluid-tight elastomer seal into the seal-gap or pull them away from the seal-gap. This pressure difference causes extrusion of the elastomer seals and cutting of the respective elastomer as the cutter cone rotates. Once an elastomer seal is cut, the integrity of the seal is lost, and the roller cone rock bit will fail shortly. The fact that the second elastomer seal cannot be fluid-tight in conventional roller cone bits limits the effectiveness of the second seal.

SUMMARY OF THE INVENTION

Therefore a need, has arisen for a roller cone rock bit having a sealing system that better maintains the integrity of the seals and lubricant system producing a longer roller cone rock bit life.

In accordance with the present invention, a roller cone rock bit is provided that includes a sealing system with double elastomer seals between the cutter cone and its associated spindle that operates to equalize the pressure between the elastomer seals to substantially eliminate or reduce disadvantages and problems associated with prior roller cone rock bits.

According to one embodiment of the present invention, a roller cone rock bit is provided that has a sealing system with double elastomer seals. A bit body is provided with at least one downwardly extending arm terminating in a spindle. A cutter cone is rotatably mounted on the spindle. The cone has a cavity for receipt of the spindle. A bearing assembly is disposed within the cavity for rotary load bearing engagement between the spindle and the cone. A first elastomer seal is preferably disposed between the cone and the spindle. The first elastomer seal is operable to seal the cavity and the bearing assembly. A second elastomer seal is preferably disposed between the cone and the spindle. The second elastomer seal is located outward from the first elastomer seal forming a seal-gap between the first elastomer seal and the second elastomer seal. The second elastomer seal is operable to seal the seal-gap from fluids external to the roller cone rock bit. A main lubricant reservoir having an inner chamber and an outer chamber with a diaphragm disposed therebetween is preferably provided in each arm. The inner chamber is in fluid communication with the cavity. The outer chamber is in fluid communication with the external fluids. The cavity and the inner chamber are substantially filled with a first lubricant forming a first volume of lubricant. The diaphragm is operable to transmit a pressure of the external fluids to the first volume of lubricant. A separate seal-gap lubricant reservoir has a diaphragm disposed between an inner chamber and an outer chamber. The inner chamber is in fluid communication with the seal-gap, and the outer chamber is in fluid communication with the external fluids. The seal-gap and the inner chamber are substantially filled with a second lubricant forming a second volume of lubricant. The diaphragm is operable to transmit the pressure of the external fluids to the second volume of lubricant.

A technical advantage of the present invention is a roller cone rock bit having a sealing system that operates to equalize the pressures of three fluids: fluids external to the roller cone rock bit, a volume of lubricant in a seal-gap between two seals and a volume of lubricant in the internal cavity of the respective cutter cone.

Another technical advantage of the present invention is the capability to have double elastomer seals forming two fluid tight seals separated by a seal-gap. This is particularly advantageous in a roller cone rock bit used in a high pressure down hole environment. Equalization of pressure in the seal-gap maintains the integrity of both fluid-tight seals providing an increase in the life of the seals and the associated bearing. This in turn directly increases the life of the roller cone rock bit. The two fluid-tight seals work in tandem to prevent debris, water and other external fluids from contaminating the lubricant system.

A further technical advantage of the present invention is the capability of filling the seal-gap with a lubricant that is different from the lubricant filling the internal cavity in the cutter cone. Thus, the lubricant sealed behind the inward elastomer seal can be different from the lubricant in the seal-gap because the two volumes of lubricant are isolated and pressure controlled by independent pressure-equalizing lubricant reservoirs.

BRIEF DESCRIPTION OF THE DRAWINGS

A more complete understanding of the present invention may be acquired by referring to the following description taken in conjunction with the accompanying drawings in which like reference numbers indicate like features and wherein.

DETAILED DESCRIPTION OF THE INVENTION

The preferred embodiments of the present invention and its advantages are best understood by referring to FIGS. 1, 2, 3A and 3B of the drawings, like numerals being used for like and corresponding parts of the drawings.

Figure 1:
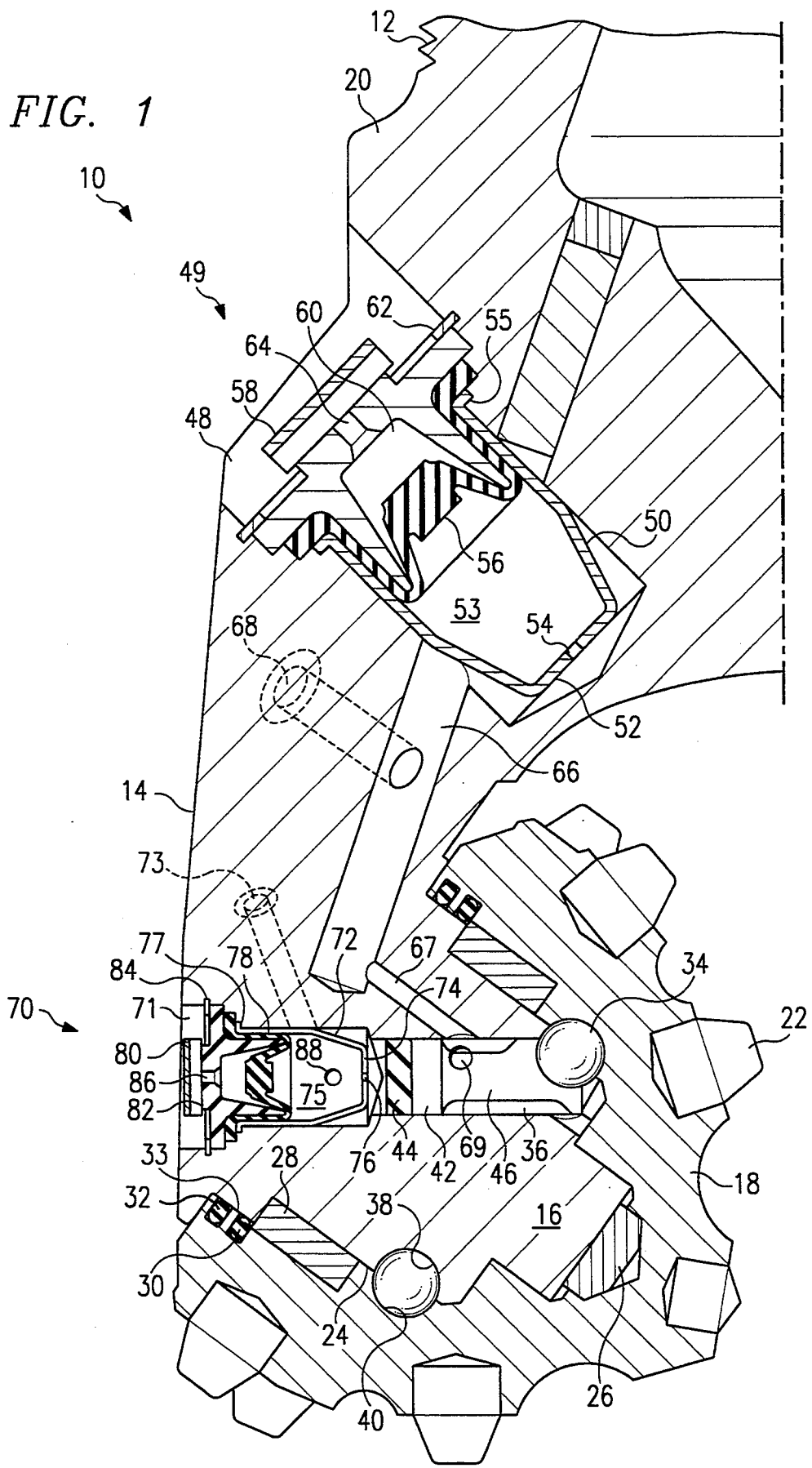
FIG. 1 illustrates a cross sectional view with portions broken away of one embodiment of a roller cone rock bit constructed according to the teachings of the present invention.

FIG. 1 illustrates a cross sectional view of a portion of one embodiment of a roller cone rock bit, indicated generally at 10, constructed according to the teachings of the present invention. Roller cone rock bit 10 includes a pressure compensated lubrication system having double elastomer seals according to the teachings of the present invention. In a completed roller cone rock bit, there are generally three arms, with each arm having an independent lubrication system for the respective cutter cone mounted on the associated spindle.

Roller cone rock bit 10 includes a bit body having an upper threaded portion 12 for connecting roller cone rock bit 10 to the lower end of a rotary drill string. On the end opposite threaded portion 12 is a depending arm 14 terminating in an inwardly and downwardly directed spindle 16 on which a cutter cone 18 is rotatably mounted. The portion of roller cone rock bit 10 intermediate threaded portion 12 and spindle 16 provides a thickened dome portion 20.

Cutter cone 18 is a generally conically shaped structure having tungsten carbide or other cutting structures 22 projecting outwardly from its surface. Cutter cone 18 has an internal cavity 24 shaped to be rotatably supported on spindle 16. As is shown in FIG. 1, internal cavity 24 includes a thrust button 26 for thrust bearing engagement with spindle 16 and includes a plurality of roller bearings 28 set into internal cavity 24 for rotational bearing engagement with spindle 16. A first elastomer seal 30 is located at the mouth of internal cavity 24 to provide a seal between internal cavity 24 and spindle 16. Seal 30 provides a sealed bearing assembly for cutter cone 18 mounted on spindle 16. A second elastomer seal 32 is preferably located outward from elastomer seal 30 as shown. Elastomer seal 32 provides a seal between cutter cone 18 and the adjacent portion of spindle 16. A seal-gap 33 is formed between first elastomer seal 30 and second elastomer seal 32. In one embodiment of the present invention, elastomer seal 30 and elastomer seal 32 are both fluid-tight seals.

Cutter cone 18 is retained on spindle 16 by a plurality of ball bearings 34 inserted through a ball passage 36 in spindle 16. Ball bearings 34 reside in an annular array within cooperatively associated ball races 38 and 40 in spindle 16 and cutter cone 18, respectively. Once inserted, ball bearings 34 prevent the disengagement of cutter cone 18 from spindle 16. Ball passage 36 subsequently is plugged with a ball plug 42 that is fixed in place by weld 44. Ball plug 42 includes a necked down intermediate portion 46.

A first lubricant cavity 48 open to the outside surface of roller cone rock bit 10 is provided in dome portion 20. Lubricant cavity 48 houses a main lubricant reservoir indicated generally at 49. Main lubricant reservoir 49 comprises a generally cylindrical lubricant container 50 disposed within lubricant cavity 48. Lubricant container 50 has a closed end 52 defining an inner chamber 53. The closed end 52 has a lubricant opening 54. The opposite open end of lubricant container 50 has a flanged shoulder 55 supporting a flexible resilient diaphragm 56 that closes lubricant container 50. A cap 58 covers diaphragm 56 and defines an outer chamber 60 facing diaphragm 56 to provide a volume into which diaphragm 56 can expand. Cap 58, diaphragm. 56 and lubricant container 50 are retained within lubricant cavity 48 by a snap ring 62. Cap 58 also includes an opening 64 for placing the outer face of diaphragm 56 in fluid communication with external fluids surrounding roller cone rock bit 10. Inner chamber 53 between diaphragm 56 and lubricant container 50 may be filled with a suitable lubricant to define a source of lubricant for roller bearings 28 and ball bearings 24 in roller cone rock bit 10.

A lubricant passage 66 and a lubricant passage 67 are drilled through arm 14 to place lubricant cavity 48 in fluid communication with ball passage 36. Lubricant passage 66 is drilled from an end of lubricant cavity 48 generally adjacent lubricant opening 54 in lubricant container 50. Ball passage 36 is placed in fluid communication with internal cavity 24 by conduit 69. Upon assembly of roller cone rock bit 10, lubricant passage 66, lubricant passage 67, lubricant container 50, inner chamber 53, the available space in the ball plug passage 36, conduit 69 and the available space in internal cavity 24 are filled with a first lubricant through an opening 68 in arm 14. This first lubricant forms a first volume of lubricant. Opening 68 is subsequently sealed after lubricant filling.

A second lubricant reservoir or seal-gap lubricant reservoir, indicated ,generally at 70, is located in lubricant cavity 71 open to the outside surface of roller cone rock bit 10. Seal-gap lubricant reservoir 70 comprises a generally cylindrical lubricant container 72 disposed within lubricant cavity 71. For one application, lubricant cavity 71 may be formed concentric with ball passage 36 and located outward from weld 44.

Lubricant container 72 preferably has a closed end 74 defining an inner chamber 75. Closed end 74 has a lubricant opening 76. The opposite open end has a flanged shoulder 77 supporting a flexible resilient diaphragm 78 closing lubricant container 72. A cap 80 covers diaphragm 78 and defines an outer chamber 82 facing diaphragm 78 to provide a volume into which diaphragm 78 can expand. Cap 80, diaphragm 78 and lubricant container 72 are retained within lubricant cavity 78 by a snap ring 84. Cap 80 also includes an opening 86 placing the outer face of diaphragm 78 in fluid communication with the external fluids surrounding roller cone rock bit 10. Inner chamber 75 between diaphragm 78 and lubricant container 72 is filled with a suitable lubricant through opening 73 to define a source of lubricant for seal-gap 33 between elastomer seal 30 and elastomer seal 32. Opening 73 is subsequently sealed after lubricant filling. Seal-gap passage or conduit 88 extends radially from inner chamber 75 in lubricant reservoir 70 and intersects the exterior of spindle 16 between first seal 30 and second seal 32. Seal-gap conduit 88 connects lubricant container 72 to seal-gap 33, and places seal-gap 33 in fluid communication with lubricant container 72. The lubricant with which lubricant container 72 and seal-gap 33 are filled forms a second volume of lubricant and can be different from the lubricant associated with main lubricant reservoir 49 for some applications.

The pressure of the external fluids outside roller cone rock bit 10 is transmitted to the lubricant in lubricant container 50 through diaphragm 56. The flexing of diaphragm 56 maintains the lubricant at a pressure generally equal to the pressure of the external fluids outside roller cone rock bit 10. This pressure is transmitted through lubricant passage 66, lubricant passage 67, ball passage 36, conduit 69 and internal cavity 24 to the inward face of elastomer seal 30 exposing elastomer seal 30 to an internal pressure from the lubricant generally equal to the pressure of the external fluids.

Similarly, the external fluid pressure is transmitted to the lubricant in lubricant container 72 through diaphragm 78 to maintain the lubricant in lubricant container 72 substantially equal to the pressure of the external fluids outside roller cone rock bit 10. This pressure is transmitted through seal-gap conduit 88 to seal-gap 33 exposing elastomer seal 32 to a pressure from the lubricant in seal-gap 33 generally equal to the pressure of the external fluids.

The sealing system of the present invention operates to equalize the pressure of the two volumes of lubricant sealed within roller cone rock bit 10 with the pressure of the external fluids. The pressure of the external fluids is substantially equal to the pressure of the lubricant in seal-gap 33 and is substantially equal to the pressure of the lubricant in internal cavity 24. Thus, the pressure of the lubricant in seal-gap 33 is substantially equal to the pressure of the lubricant in internal cavity 24. In this way, the three pressures are equalized and a pressure differential is prevented. This prevents extrusion of elastomer seal 30 and elastomer seal 32 lengthens the life time of these seals.

Figure 2:
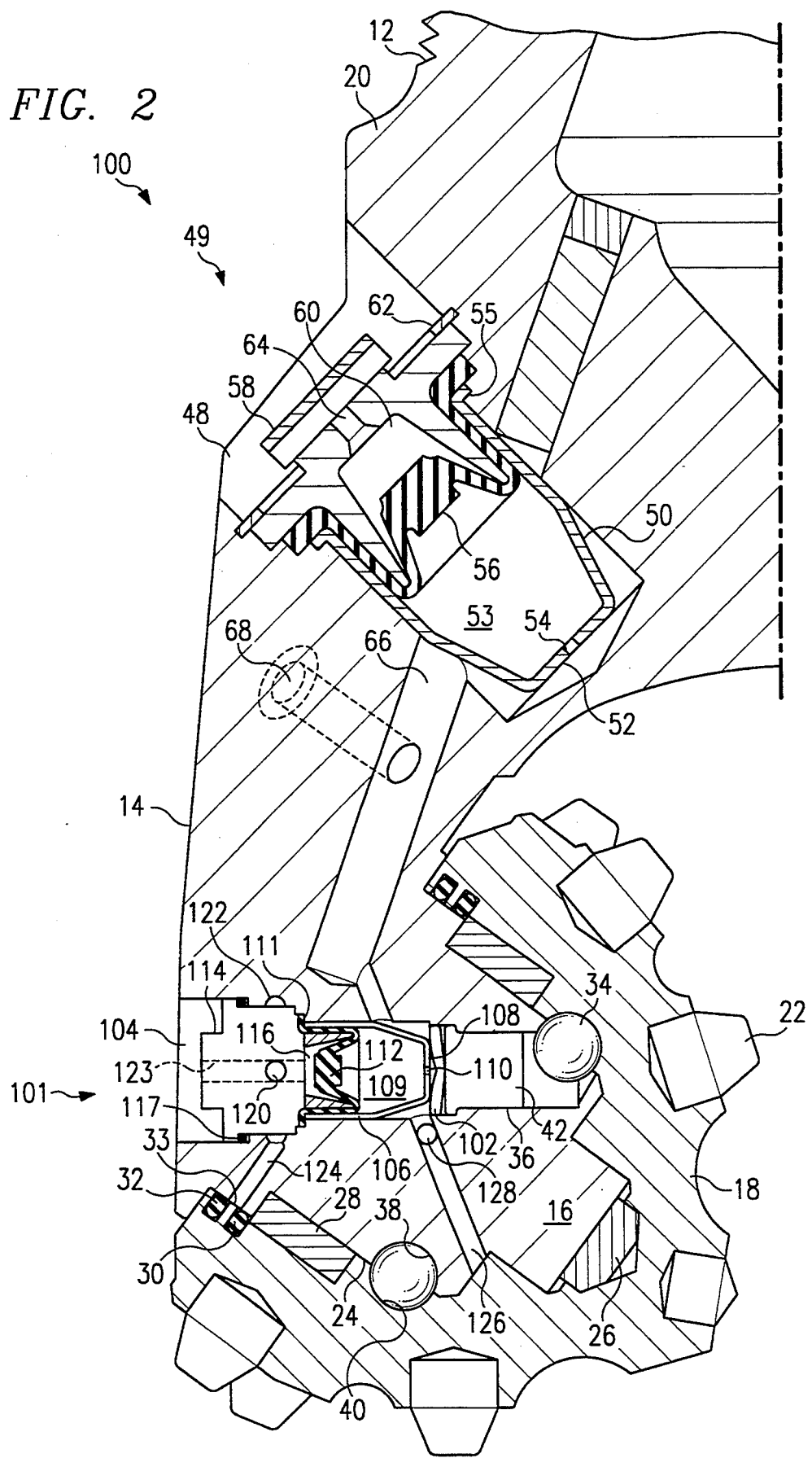
FIG. 2 illustrates a cross sectional view with portions broken away of another embodiment of a roller cone rock bit constructed according to the teachings of the present invention.

FIG. 2 illustrates a cross sectional view of another embodiment of a roller cone rock bit, indicated generally at 100, constructed according to the teachings of the present invention. The roller cone rock bit 100 is similar to the roller cone rock bit 10 illustrated in FIG. 1. The differences are in the placement of the seal-gap lubricant reservoir, indicated generally at 101. A ball plug retainer 102 holds ball plug 42 in place. Ball plug retainer 102 comprises any object sized to hold ball plug 42 in place. In one embodiment of the present invention, ball plug retainer 102 comprises a nut engaged with threads (not shown) formed in the interior of ball passage 36.

A lubricant cavity 104 open to the outside surface of the roller cone rock bit 100 is provided. Lubricant cavity 104 is preferably formed in ball passage 36. Lubricant cavity 104 houses seal-gap lubricant reservoir 101. Seal-gap lubricant reservoir 101 comprises a generally cylindrical lubricant container 106 disposed within lubricant cavity 104. Lubricant container 106 has a closed end 108 defining an inner chamber 109. Closed end 108 has a lubricant opening 110. The opposite end of lubricant container 106 has a flanged shoulder 111 supporting a flexible resilient diaphragm 112 for closing lubricant container 106. A cap 114 covers diaphragm 112 and defines an outer chamber 116 facing diaphragm 112 to provide a volume into which diaphragm 112 can expand. An elastomer seal 117 is disposed between cap 114 and arm 14 as shown. Diaphragm 112 and lubricant container 106 are retained within lubricant cavity 104 by cap 114 which is fixably engaged to arm 14.

Cap 114 includes an opening 120 extending radially from outer chamber 116 for placing the outer face of diaphragm 112 in fluid communication with a groove 122 as shown. Groove 122 is in fluid communication with conduit 124, which is in fluid communication with seal-gap 33 between elastomer seal 30 and elastomer seal 32. Lubricant passage 126 intersects lubricant cavity 104 placing lubricant cavity 104 in fluid communication with lubricant passage 66. Conduit 128 places lubricant passage 126 in fluid communication with internal cavity 24.

Main lubricant reservoir 49, lubricant passage 66, lubricant passage 126, conduit 128, lubricant container 106 and internal cavity 24 are filled with a lubricant suitable to define a source of lubricant for ball bearings 34 and roller bearings 28. This lubricant forms a first volume of lubricant. Seal-gap 33, conduit 124, groove 122 and outer chamber 116 are filled with the same type of lubricant through filler hole 123 to provide lubrication to seal-gap 33 and to form a second volume of lubricant. Outer chamber 116 is evacuated and filled simultaneously with inner chamber 53 and inner chamber 109.

The external fluid pressure is transmitted to the lubricant in lubricant container 50 and thus to internal cavity 24 as described with respect to the embodiment illustrated in FIG. 1. The pressure of this volume of lubricant is transmitted to seal-gap 33 through diaphragm 112 in seal-gap lubricant reservoir 101 since both sides of diaphragm 112 are completely full of lubricant. In operation, the pressure of the lubricant in internal cavity 24 is equalized with the pressure of the external fluids. The pressure in seal-gap 33 is then equalized with the pressure of the lubricant in internal cavity 24. In this way, the external fluids pressure, the seal-gap pressure and the internal cavity pressure are equalized. The equalization of pressure protects the integrity of elastomer seal 30 and elastomer seal 32. This also allows elastomer seal 30 and elastomer seal 32 to be fluid-tight without compromising the life of the seals.

Figure 3A:
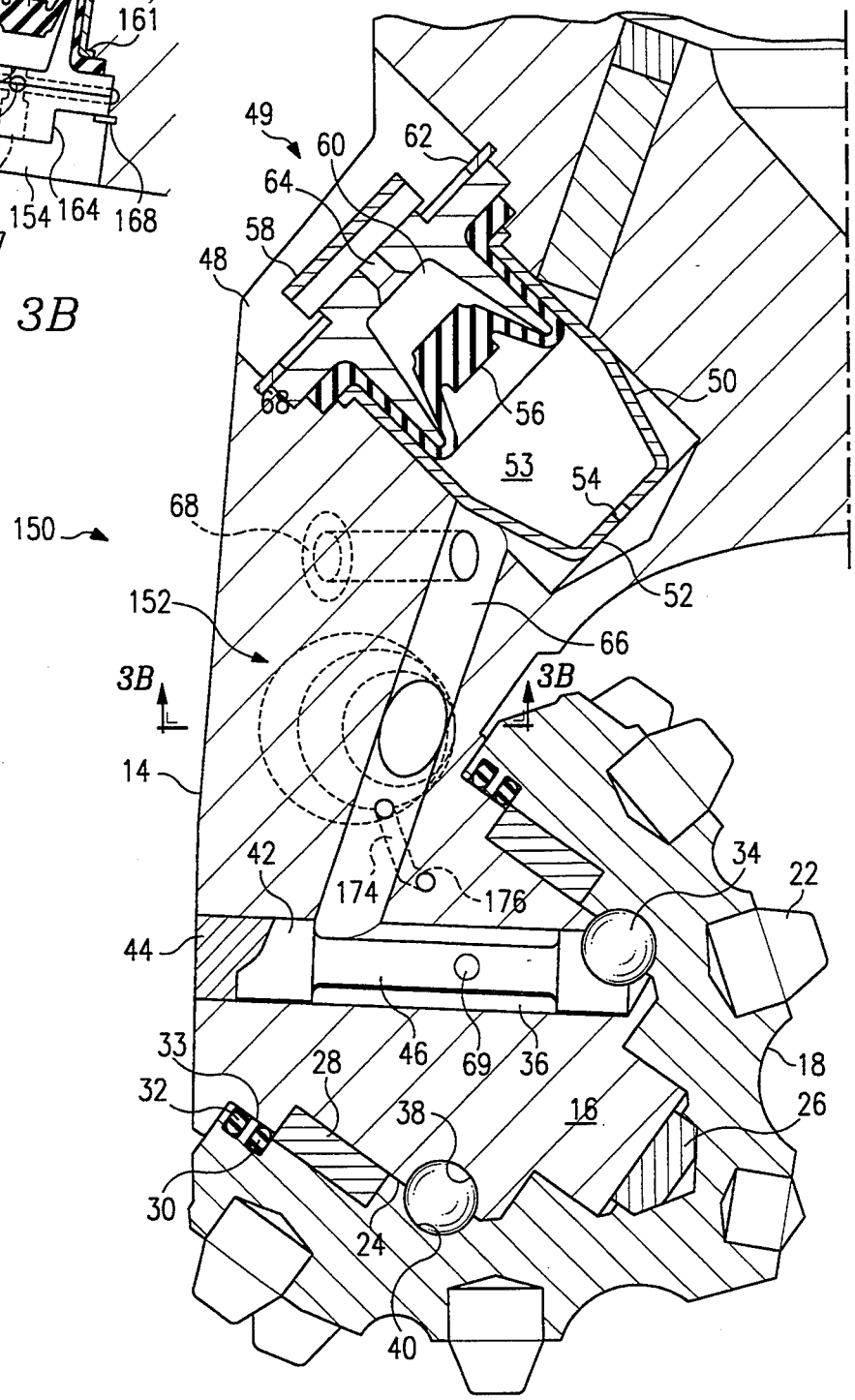
FIGS. 3A and 3B illustrate a cross sectional view with portions broken away of a further embodiment of a roller cone rock bit constructed according to the teachings of the present invention.
Figure 3B:
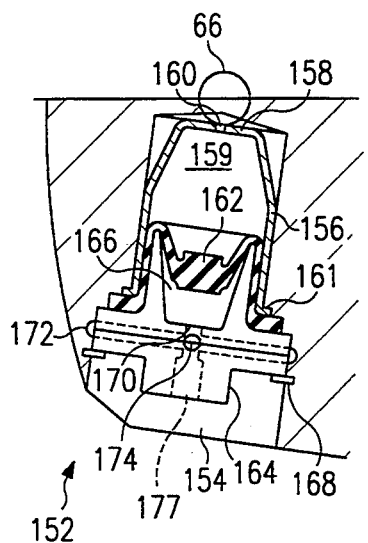

FIGS. 3A and 3B illustrate another embodiment of a roller cone rock bit, indicated generally at 150, constructed according to the teachings of the present invention. Roller cone rock bit 150 has differences between roller cone rock bit 150 and previously described roller cone rock bit 100 which is the position of the seal-gap lubricant reservoir, indicated generally at 152.

Roller cone rock bit 150 has a lubricant cavity 154 open to the outside surface of the rock bit 150 as shown. Lubricant cavity 154 is formed in a lower portion of arm 14 and houses seal-gap lubricant reservoir 152.

Seal-gap lubricant reservoir 152 comprises a generally cylindrical lubricant container 156 disposed within lubricant cavity 154. Lubricant container 154 has a closed end 158 defining an inner chamber 159. Closed end 158 has a lubricant opening 160. The opposite end of lubricant container 156 has a flanged shoulder 161 supporting a flexible resilient diaphragm 162 for closing lubricant container 156. A cap 164 covers diaphragm 162 and defines an outer chamber 166 facing diaphragm 162 to provide a volume into which diaphragm 162 can expand. Cap 164, diaphragm 162 and lubricant container 156 are retained within lubricant cavity 154 by a snap ring 168.

Cap 164 includes an opening 170 for placing the outer face of diaphragm 162 in fluid communication with a groove 172. Groove 172 is in fluid communication with conduit 174 which is in fluid communication with conduit 176. Conduit 176 is in fluid communication with seal-gap 33.

Seal-gap 33, conduit 176, conduit 174, groove 172, and outer chamber 166 are filled, through a filler hole 177, with a lubricant suitable to lubricate elastomer seal 30 and elastomer seal 32. Lubricant opening 160 places lubricant cavity 154 in fluid communication with lubricant passage 66 as shown in FIG. 3B. Lubricant passage 66 intersects ball passage 36 as shown in FIG. 3A. A conduit 69 places ball passage 36 in fluid communication with internal cavity 24. Thus, lubricant in inner chamber 159 is in communication with lubricant in chamber 53 similar to the embodiment illustrated in FIG. 2. Seal-gap lubricant reservoir 152 operates to equalize the pressure in seal-gap 33 with the pressure of the first volume of lubricant associated with main lubricant reservoir 49. Main lubricant reservoir 49 operates as described above to equalize the pressure of the lubricant in internal cavity 24 with the pressure of external fluids.

The sealing system having double elastomer seals of the present invention operates to equalize pressures exerted by external fluids, lubricant in internal cavity 24 and lubricant in seal-gap 33. This allows the use of two fluid-tight elastomer seals to seal internal cavity 24 from external fluids and debris. A roller cone rock bit constructed according to the teachings of the present invention enjoys longer life time due to the superior sealing of the two fluid-tight elastomer seals and due to the longer life time of those seals. Any rock bit can benefit from the teachings of the present invention, especially those of size $12\frac{1}{4}''$ and larger, as they have more space to hold the seal-gap lubricant reservoir.

A technical advantage of the present invention is a roller cone rock bit having a sealing system that operates to equalize the pressures of three fluids: fluids external to the roller cone rock bit, a volume of lubricant in a seal-gap between two seals and a volume of lubricant in the internal cavity of the respective cutter cone.

Another technical advantage of the present invention is the capability to have double elastomer seals forming two fluid tight seals separated by a seal-gap. This is particularly advantageous in a roller cone rock bit used in a high pressure down hole environment. Equalization of pressure in the seal-gap maintains the integrity of both fluid-tight seals providing an increase in the life of the seals and the associated bearing. This in turn directly increases the life of the roller cone rock bit. The two fluid-tight seals work in tandem to prevent debris, water and other external fluids from contaminating the lubricant system.

A further technical advantage of the present invention is the capability of filling the seal-gap with a lubricant that is different from the lubricant filling the internal cavity in the cutter cone, as illustrated in FIG. 1. Thus, the lubricant sealed behind the inward elastomer seal can be different from the lubricant in the seal-gap because the two volumes of lubricant are isolated and pressure controlled by independent lubricant reservoirs. Additionally, the two reservoirs illustrated in FIG. 1 are isolated from each other such that a breaching of the outer seal by the borehole environment will not cause contamination of the lubricant in the inner cavity and bit life will be sustained by the inner seal.

Although the present invention has been described in detail, it should be understood that various changes, substitutions and alterations can be made hereto without departing from this spirit and scope of the invention as defined by the appended claims.

What is claimed is:

1. A roller cone rock bit having a sealing system with double elastomer seals, comprising:
   a bit body having at least one downwardly extending arm terminating in a spindle;
   a cone having a cavity for rotatably mounting the cone on the spindle;
   a bearing assembly disposed within the cavity for rotary load bearing engagement between the spindle and the cone;
   a first elastomer seal disposed between the cone and the spindle, the first elastomer seal operable to seal the cavity and the bearing assembly;
   a second elastomer seal disposed between the cone and the spindle, the second elastomer seal located outward from the first elastomer seal forming a seal-gap between the first elastomer seal and the second elastomer seal, the second elastomer seal operable to seal the seal-gap from fluids external to the rock bit;
   a main lubricant reservoir having a first diaphragm disposed between an inner chamber and an outer chamber, the inner chamber in fluid communication with the cavity and the outer chamber in fluid communication with the external fluids, wherein the cavity and the inner chamber are substantially filled with a first lubricant forming a first volume of lubricant and wherein the first diaphragm is operable to transmit a pressure of the external fluids to the first volume of lubricant; and
   a seal-gap lubricant reservoir having a second diaphragm disposed between an inner chamber and an outer chamber, the inner chamber in fluid communication with the seal-gap and the outer chamber in fluid communication with the external fluids, wherein the seal-gap and the inner chamber are substantially filled with a second lubricant forming a second volume of lubricant and wherein the second diaphragm is operable to transmit the pressure of the external fluids to the second volume of lubricant.

2. The roller cone rock bit of claim 1, wherein the first elastomer seal comprises an elastomer seal operable to form a fluid-tight seal.

3. The roller cone rock bit of claim 2, wherein the first elastomer seal comprises a positive seal.

4. The roller cone rock bit of claim 2, wherein the second elastomer seal comprises an elastomer seal operable to form a fluid-tight seal.

5. The roller cone rock bit of claim 4, wherein the second elastomer seal comprises a positive seal.

6. The roller cone rock bit of claim 1, wherein the first lubricant is less viscous than the second lubricant.

7. The roller cone rock bit of claim 1, wherein the first lubricant is the same as the second lubricant.

8. The roller cone rock bit of claim 1, further comprising a ball passage formed in the arm and receiving the seal-gap lubricant reservoir.

9. The roller cone rock bit of claim 1, wherein the bearing assembly comprises a plurality of ball bearings.

10. The roller cone rock bit of claim 1, wherein the bearing assembly comprises a plurality of roller bearings.

11. A roller cone rock bit having a sealing system with double elastomer seals, comprising:
    a bit body having at least one downwardly extending arm terminating in a spindle;
    a cone having a cavity for rotatably mounting the cone on the spindle;
    a bearing assembly disposed within the cavity for rotary load bearing engagement between the spindle and the cone;
    a first elastomer seal disposed between the cone and the spindle, the first elastomeric seal operable to seal the cavity and the bearing assembly;
    a second elastomer seal disposed between the cone and the spindle, the second elastomer seal located outward from the first elastomer seal forming a seal-gap between the first elastomer seal and the second elastomer seal, the second elastomer seal ring operable to seal the seal-gap from fluids external to the roller cone rock bit;
    a main lubricant reservoir having a first diaphragm disposed between an inner chamber and an outer chamber, the inner chamber in fluid communication with the cavity and the outer chamber in fluid communication with the external fluids, wherein the cavity and the inner chamber are substantially filled with lubricant forming a first volume of lubricant and wherein the first diaphragm is operable to transmit a pressure of the external fluids to the first volume of lubricant; and
    a seal-gap lubricant reservoir having a second diaphragm disposed between an inner chamber and an outer chamber, the inner chamber in fluid communication with the inner chamber of the main lubricant reservoir and the outer chamber in fluid communication with the seal-gap, wherein the inner chamber of the seal-gap lubricant reservoir is substantially filled with lubricant enlarging the first volume of lubricant, wherein the seal-gap and the outer chamber are substantially filled with lubricant forming a second volume of lubricant, and wherein the second diaphragm is operable to transmit a pressure of the first volume of lubricant to the second volume of lubricant.

12. The roller cone rock bit of claim 11, wherein the first elastomer seal comprises an elastomer seal operable to form a fluid-tight seal.

13. The roller cone rock bit of claim 12, wherein the first elastomer seal comprises a positive seal.

14. The roller cone rock bit of claim 12, wherein the second elastomer seal comprises an elastomer seal operable to form a fluid-tight seal.

15. The roller cone rock bit of claim 14, wherein the second elastomer seal comprises a positive seal.

16. The roller cone rock bit of claim 11, further comprising a lubricant cavity formed in the arm and receiving the seal-gap lubricant reservoir.

17. The roller cone rock bit of claim 11, further comprising a ball passage formed in the arm and receiving the seal-gap lubricant reservoir.

18. The roller cone rock bit of claim 11, wherein the main lubricant reservoir is disposed in the arm and the seal-gap lubricant reservoir is disposed in the arm.

19. The roller cone rock bit of claim 11, wherein the bearing assembly comprises a plurality of ball bearings.

20. The roller cone rock bit of claim 11, wherein the bearing assembly comprises a plurality of roller bearings.

* * * * *